United States Patent

Poirot

[15] 3,643,632
[45] Feb. 22, 1972

[54] AUTOMATICALLY OPERATED FEEDING DEVICE

[72] Inventor: Eugene M. Poirot, Golden City, Mo. 64748

[22] Filed: Aug. 28, 1970

[21] Appl. No.: 67,751

[52] U.S. Cl. ...................................................................119/54
[51] Int. Cl. .....................................A01k 5/02, A01k 64/00
[58] Field of Search ..................119/51, 54, 81, 79; 137/425; 251/174

[56] References Cited

UNITED STATES PATENTS

| | | | |
|---|---|---|---|
| 448,262 | 3/1891 | Runnels | 137/425 |
| 3,487,433 | 12/1969 | Fleming | 119/51 |

Primary Examiner—Aldrich F. Medbery
Attorney—Rogers, Ezell, Eilers & Robbins

[57] ABSTRACT

A feeding device for fish or other aquatic creatures has a feed-dispensing container disposed above the level of the water, has a feed-supporting tray disposed below the level of the water, and has a yieldable connection between that tray and the valve of that container. That yieldable connection will permit waves to induce rising and falling of that container relative to that tray without causing excessive release of feed from that container.

10 Claims, 4 Drawing Figures

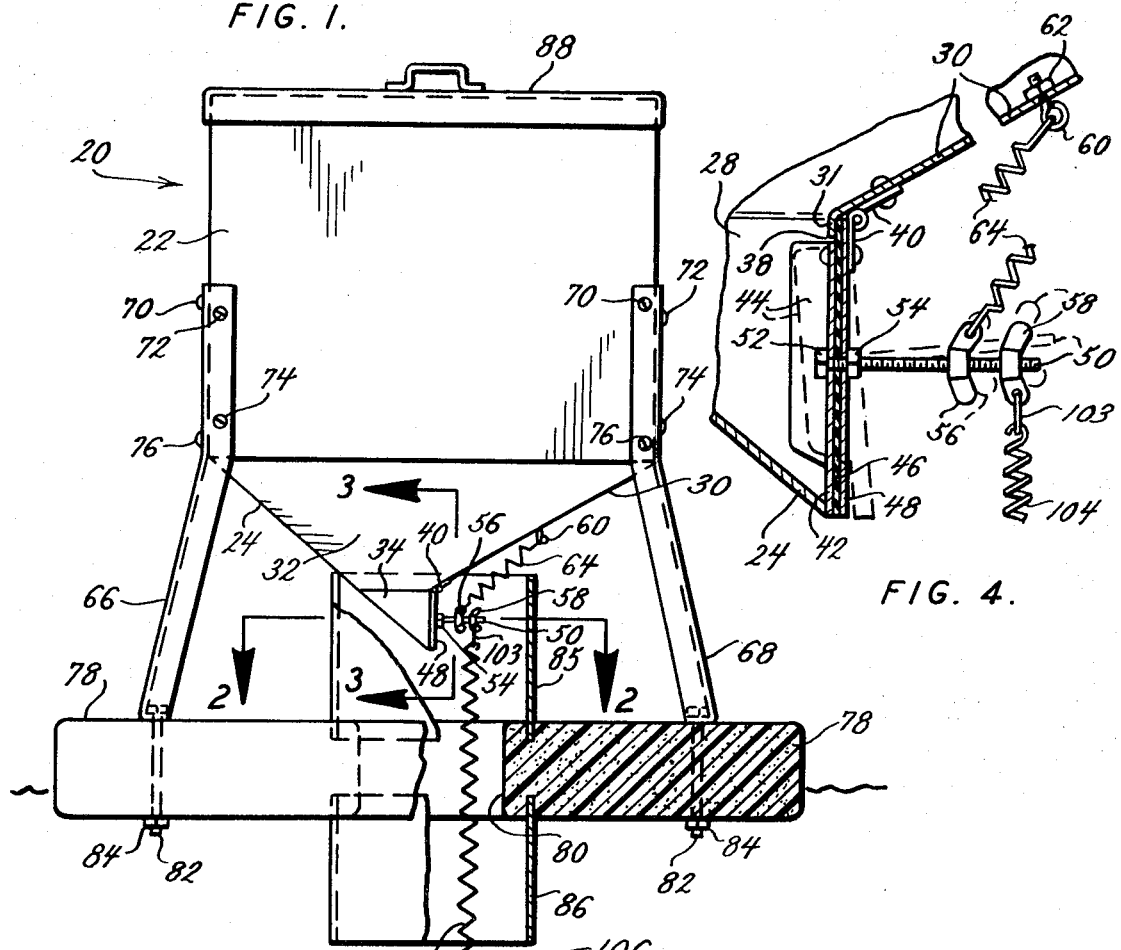

AUTOMATICALLY OPERATED FEEDING DEVICE

This invention relates to improvements in feeding devices. More particularly, this invention relates to improvements in devices that can automatically dispense feed for fish or other aquatic creatures.

It is, therefore, an object of the present invention to provide an improved device which can automatically dispense feed for fish or other aquatic creatures.

The feeding device provided by the present invention has a feed-dispensing container disposed above the level of the water, has a feed-supporting tray disposed below the level of the water, and has a connection between that tray and the valve of that container. That connection permits that valve to open whenever the weight of the feed on that tray falls below a predetermined value; and, as that valve opens, additional feed from that container will fall downwardly onto that tray—until the weight of the feed on that tray is great enough to cause the valve to close. Whenever the water is essentially free of waves which could cause relative movement between the feed-dispensing container and the feed-supporting tray, the valve of that container will maintain a regulated weight of feed on that tray. However, when waves appear on the surface of the water, those waves can cause relative movement between the feed-dispensing container and the feed-supporting tray, and can thereby tend to cause extra amounts of feed to be dispensed from that container. Specifically, if the feed-dispensing container was mounted on a float, that float would tend to cause that container to rise and fall as the waves rose and fell, even though the feed-supporting tray will resist all forces tending to move it upwardly or downwardly. If the connection between the feed-dispensing container and the feed-supporting tray was unyielding in nature, and if a wave raised the float and that container, that connection would force the feed-supporting tray to move upwardly. Thereafter, when the float and container were lowered by the trough that succeeded the wave, the resistance of the tray to downward movement would enable that tray to cause the unyielding connection to move the valve of the container to open position—even though that tray was supporting its scheduled weight of feed. Each succeeding wave-induced downward movement of the feed-dispensing container relative to the feed-supporting tray would enable that tray to cause the unyielding connection to move the valve of the container to open position—thereby causing needless and wasteful dispensing of feed onto that tray. However, the present invention avoids needless and wasteful dispensing of feed onto the feed-supporting tray by providing a yielding connection between that tray and the valve of the feed-dispensing container. That yielding connection will, as long as the surface of the water is essentially free of waves, act as an unyielding connection between that tray and that valve; but it will, whenever waves cause relative movement between that tray and the feed-dispensing container, yield to permit that container to move downwardly relative to that tray without causing the valve to open. As a result, the yielding connection provided by the present invention will permit the valve of the feed-dispensing container to open whenever the fish or other aquatic creatures have eaten a predetermined amount of the feed, and will then respond to the dispensing of further feed onto the feed-supporting tray to hold that valve closed, but will yield to keep wave-induced relative movements of that container toward that tray from causing repeated openings of that valve. It is, therefore, an object of the present invention to provide a feed-dispensing container that is disposed above the level of the water, a feed-supporting tray that is disposed below the level of the water, and a connection between that tray and the valve of that container which normally acts as an unyielding connection but that yields when waves cause relative movement between that container and that tray.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

In the drawing,

FIG. 1 is a partially broken away side elevational view of one preferred embodiment of automatically operated feeding device that is made in accordance with the principles and teachings of the present invention, FIG. 2 is a sectional view, on a much larger scale, of the valve of that feeding device, FIG. 3 is a partially broken away sectional view, on the scale of FIG. 2, through the valve shown in FIG. 2, and it is taken along the plane indicated by the line 3—3 in FIG. 1, and FIG. 4 is a sectional view, on the scale of FIG. 2, through the valve shown in FIG. 2, and it is taken along the plane indicated by the line 4—4 in FIG. 3.

Referring to the drawing in detail, the numeral 20 generally denotes a feed-dispensing container; and that container has a four-sided upper portion 22, and has a bottom which generally resembles an inverted pyramid. That bottom has an inclined wall 24, has an inclined wall 26 with a vertically depending lower portion 28, has an inclined wall 30 with a vertically depending lower portion 31, and has an inclined wall 32 with a vertically depending lower portion 34. The inclined walls 24, 26, 30 and 32 will cause any feed in the container 20 to respond to gravity to move downwardly toward the area defined by the lower portion of the wall 24, by the vertically depending portion 28 of the wall 26, by the vertically depending portion 31 of the wall 30, and by the vertically depending portion 34 of the wall 32; and an opening 38 in the vertically depending portion 31 of the wall 30 communicates with that area. As a result, the feed within the container 20 will tend to move downwardly into register with, and then through, the opening 38.

A hinge 40 normally holds a doorlike valve 42 in register with the opening 38; and that doorlike valve has flanges 44 along the side edges thereof which are dimensioned to extend within that opening. The upper ends of the flanges 44 will extend into the opening 38—even when the doorlike valve 42 has been moved an appreciable distance away from the opening 38. A flexible plate 46 is disposed at the outer face of, and extends laterally outwardly beyond the side edges of, the doorlike valve 42; and a backing plate 48 is disposed at the outer surface of the flexible plate 46. A threaded rod 50 extends through the backing plate 48, through the flexible plate 46, and through the doorlike valve 42; and that threaded rod is disposed at right angles to that backing plate. A nut 52 is threaded onto the inner end of the threaded rod 50, and that nut abuts the inner face of the doorlike valve 42; while a nut 54 is threaded onto the threaded rod 50, and that nut abuts the outer face of the backing plate 48. The nuts 52 and 54 will be tightened, respectively, against the doorlike valve 42 and the backing plate 48, and thus will fixedly hold the threaded rod 50 relative to that doorlike valve. Wingnuts 56 and 58 are threaded onto the outer end of the threaded rod 50; and each of those wingnuts has an opening in one of the wings thereof.

An eyebolt 60 has the shank thereof extending through an opening in the inclined wall 30 of the bottom of the container 20; and a nut 62 is threaded onto that shank to fixedly secure that eyebolt to that container. A helical extension spring 64 has the upper end thereof hooked through the eye of the eyebolt 60, and it has the lower end thereof hooked through the opening in the wingnut 56. That spring biases the doorlike valve 42 toward open position, but it can yield to permit that doorlike valve to be moved to, and held in, closed position.

The container 20 has four legs; but only two of those legs, namely, legs 66 and 68, are shown in the drawing. The other two legs are disposed behind, and are hidden by, the legs 66 and 68. The upper portions of the four legs abut the corners of the upper portion 22 of the container 20. Openings in the tops of those legs and aligned openings in the portion 22 accommodate the bolts of bolt and nut combinations 70. Openings close to the tops of those legs and aligned openings in the portion 22 accommodate the bolts of bolt and nut combinations 72. Further openings in those legs are aligned with openings adjacent the bottom of the portion 22 to receive the bolts of nut and bolt combinations 74 and 76. Those nut and bolt combinations solidly secure those legs to the upper portion 22.

The numeral 78 denotes a float which has a centrally located opening 80 therein. That float can be made of any desired material, and it can be made in any desired form and size. In the preferred embodiment of feeding device provided by the present invention, the float 78 is made from a plastic material which has a multiplicity of air cells therein to render that float buoyant. Bolts 82 extend downwardly through feet on the four legs of the container 20, and then extend through the float 78 to receive nuts 84. If desired, openings could be drilled in the float 78 for the bolts 82, but, where that float is made from a plastic material which has a multiplicity of air cells therein, it is only necessary to press the lower ends of those bolts through that material. The legs of the container 20 will be so located relative to the opening 80 that the doorlike valve 42 will be disposed above, and effectively in register with, the geometric center of that opening.

A tube 85 has the lower end thereof pressed into the upper surface of the float 78; and it has its upper end surrounding the lower portion of inclined wall 24, the vertically depending portion 28 of inclined wall 26, the vertically depending portion 31 of inclined wall 30, the vertically depending portion 34 of inclined wall 32, the opening 38, and the doorlike valve 42. That tube will keep almost all rain, sleet, hail, snow, dust, spray, splashed water, and the like from reaching the flexible plate 46; and that flexible plate will effectively keep whatever rain, sleet, hail, snow, dust, spray, splashed water, and the like that does reach it from entering the opening 38.

A tube 86 has the upper end thereof pressed into the lower surface of the float 78; and it has its lower end extending into the water. That tube will help guide the feed downwardly toward a feed-supporting tray 90. The tube 86 is particularly useful where the feed is buoyant until it absorbs water, because it keeps that feed from moving laterally away from the tray 90 while that feed is buoyant. When that feed absorbs enough water to lose its buoyancy, it will sink downwardly onto the tray 90.

A cover 88 is provided for the container 20; and that cover has a downwardly extending flange which can snugly engage a bead at the upper edge of the portion 22 of that container. As a result, whenever the cover 88 is pressed onto the portion 22 of the container 20, it will resist accidental dislodgment therefrom. Also, that cover will coact with the flexible plate 46 for the doorlike valve 42 to protect the contents of the container 20 from rain, sleet, hail, snow, dust, spray, splashed water, and the like.

The feed-supporting tray 90 is generally flat-bottomed has flanges 92 extending upwardly from the edges thereof. That tray and its flanges will be made from a material which is resistant to corrosion. For example, that tray and its flanges could be made from water-resistant plastic material, stainless steel, or the like. That tray will be stiff, and it will be large enough to hold an appreciable amount of feed thereon. A stiff rod 94 has an eye 96 at the upper end thereof and has a thread 98 at the bottom thereof; and that thread extends through an opening in the center of the tray 90. Nuts 100 and 102 are threaded onto the thread 98 of the rod 94, and they hold that rod fixed at right angles to the plane of the bottom of the tray 90. The stiffness of the tray 90 and the stiffness of the rod 94 coact with the fixed, right-angle disposition of that tray and rod to keep that tray from tilting unduly even if feed is not precisely centered on that tray.

An S-hook 103, of standard and usual design, has the upper loop thereof passed through the opening in the wingnut 58; and that upper loop will fit loosely within that opening. A helical extension spring 104 has the lower end thereof hooked through the eye 96 of the rod 94, and has the upper end thereof hooked through the lower loop of the S-hook 103; and that upper end will fit loosely within that lower loop. As a result, the spring 104 can easily tilt in any direction relative to the threaded rod 50 without applying appreciable torsional forces to itself or to that threaded rod. The S-hook 103, the helical extension spring 104, and the rod 94 constitute a connection 106 between the doorlike valve 42 and the tray 90 which normally acts as an unyielding connection, but which can yield whenever waves cause relative movement between the container 20 and the tray 90.

The yielding connection 106, constituted by the rod 94 and the helical extension spring 104, will coact with the tray 90 and with any feed thereon to apply a downwardly directed force to the threaded rod 50, and thus will apply a rotational moment to the doorlike valve 42 which will bias that doorlike valve toward closed position. The helical extension spring 64 will apply an upwardly directed force to the threaded rod 50, and thus will apply a rotational moment to the doorlike valve 42 which will bias that doorlike valve away from closed position. The spring 64 will be strong enough to hold the doorlike valve 42 in its open position, and thus will permit feed to pass outwardly and downwardly through the opening 38 in the vertically depending portion 31 of the wall 30, until enough feed has accumulated on the tray 90 to force the doorlike valve 42 to move to its closed position. In the absence of any appreciable waves on the surface of the water on which the float 78 rests, the spring 104 of the yielding connection 106 will stretch until the restorative forces therein equal the combined weights of the tray 90 and of the feed thereon; and thereafter that spring will effectively retain its length. Consequently, in the absence of any appreciable waves on the surface of the water on which the float 78 rests, the connection 106 will effectively act as an unyielding connection—permitting decreases in the weight of the feed on the tray 90 to enable the spring 64 to open the doorlike valve 42, and permitting the resulting replenishment of the feed on that tray to reclose that doorlike valve. All of this means that the container 20, the tray 90, and the connection 106 therebetween will keep a regulated weight of feed on that tray as long as appreciable waves do not develop on the surface of the water.

In the event an appreciable wave on the surface of water causes the float 78 and the container 20 to rise upwardly, the spring 104 of the yielding connection 106 between the doorlike valve 42 and the tray 90 will be forced to yield, because that tray will resist rapid upward movement thereof through the water. As it yields, the spring 104 will develop increased restorative forces therein; and those increased restorative forces will continue to hold the doorlike valve 42 in closed position. Consequently, no feed will be dispensed by the container 20 as it is moved upwardly by the float 78. When the wave, which lifted the float 78 and the container 20, passes beyond that float, that float will fall into the trough which succeeds that wave. At such time, the container 20 will move downwardly relative to the tray 90, because that tray will resist rapid downward movement thereof through the water. The spring 104 will retract as the container 20 moves downwardly; but the restorative forces therein will continue to bias the valvelike door toward closed position. If any given upward movement of the container 20 does not enforce an appreciable upward movement of the tray 90, and if the succeeding downward movement of that container does not reduce the restorative forces within the spring 104 below their normal level, the upward and downward movement of that container will not permit the spring 64 to open the doorlike valve 42. If, however, a given upward movement of the container 20 does enforce an appreciable upward movement of the tray 90, and if the succeeding downward movement of that container does reduce the restorative forces within the spring 104 below their normal level, the upward and downward movement of that container will permit the spring 64 to open the doorlike valve 42. The resulting dispensing of feed from the container 20 onto the tray 90 will increase the downwardly directed force on, and thus will increase the restorative force within, the spring 104; and hence that spring will effectively prevent the opening of the doorlike valve 42 unless and until an even larger wave raises the float 78 and container 20. Any wave that is able to cause the doorlike valve 42 to open will be able to keep that doorlike valve open for just a very short period of time; and hence the amount of additional feed which that wave can cause the container 20 to dispense will be quite small. Further, that additional feed will increase the restorative force within the spring 104, and thus will minimize the likelihood of further wave-induced dispensing of feed by the doorlike valve 42. The overall result is that the yielding connection 106 will permit appreciable upward and downward movement of the container 20 relative to the tray 90 without the dispensing of excessive weights of feed onto that tray. Further, that yielding connection will permit appreciable upward and downward movement of that container relative to that tray without the developing of hurtful forces and stresses within that tray, within the doorlike valve 42, or within that connection. The yielding connection 106 also will permit appreciable tilting and sideways movement of the container 20 to occur without causing excessive and wasteful amounts of feed to be dispensed from that container.

While waves will be the primary cause of upward, downward, tilting or sideways movement of the container 20 relative to the tray 90, wind also will be able to move that container relative to that tray. Whether the movement of container 20 relative to the tray 90 is due to waves, to wind or to a combination of waves and wind, the yielding connection 106 will keep that movement from causing excessive and wasteful dispensing of feed from that container.

The container 20 and the doorlike valve 42 shown in the drawing are merely illustrative; and other containers and valves could be used. For example, the container and valve shown in my copending application Ser. No. 884,868 which was filed Dec. 15, 1969 for Automatically Operated Feeding Device is being used in the embodiment of the present invention which is being offered for sale.

The present invention is very useful where the container is mounted on and supported by a float, a floating dock, or the like. However, that invention also is very useful where the container is mounted on and supported by a stationary dock, by elongated legs resting on the bottom of the body of water, or the like—if the body of water can cause the tray to move up and down or from side to side. If the body of water tended to make the tray 90 move downwardly relative to the container 20, that downward movement would force the spring 104 of the yielding connection 106 to yield; but the resulting increase in the restorative force within that spring would cause that yielding connection to increase rather than decrease the forces which tend to hold the doorlike valve 42 closed. As a result, no feed would be dispensed by that container 20 as the tray 90 moved downwardly relative to that container. If the body of water subsequently tended to move the tray 90 upwardly relative to the container 20, the spring 104 would retract; but the restorative forces within that spring would continue to bias the doorlike valve 42 toward closed position. If any given water-induced upward movement of the tray 90 does not reduce the restorative forces within the spring 104 below their normal level, that upward movement will not permit the spring 64 to open the doorlike valve 42. If, however, a given water-induced upward movement of the tray 90 does reduce the restorative forces within the spring 104 below their normal level, that upward movement will permit the spring 64 to open the doorlike valve 42. The resulting dispensing of feed from the container 20 onto the tray 90 will increase the downwardly directed force on, and thus will increase the restorative force within, the spring 104; and hence that spring will effectively prevent the opening of the doorlike valve 42 unless and until an even larger water-induced upward movement of the tray 90 occurs. Any movement of the water which is able to cause the doorlike valve 42 to open will be able to keep that doorlike valve open for just a very short period of time; and hence the amount of additional feed which that movement can cause the container 20 to dispense will be quite small. Further, that additional feed will increase the restorative force within the spring 104, and thus will minimize the likelihood of further water-induced dispensings of feed by the doorlike valve 42.

The threaded rod 50 and the wingnuts 56 and 58 make it easy to adjust the effective rotational moment applied to the doorlike valve 42 by the springs 64 and 104. Rotation of the wingnut 56 so it moves toward the nut 54 will elongate, and thereby increase the restorative force within, the spring 64; whereas rotation of that wingnut so it moves away from that nut will decrease the restorative force within that spring. Rotation of the wingnut 58 so it moves toward the nut 54 will decrease the effective moment arm of the yielding connection 106; whereas rotation of that wingnut so it moves away from that nut will increase the effective moment arm of that yielding connection. However, the effective rotational moments applied to the doorlike valve 42 by the springs 64 and 104 can be adjusted in other ways, as desired.

The springs 64 and 104 are very useful; and they are relatively inexpensive, readily available, and long lived. However, if desired, elastic bands or other extensible elements could be substituted for those springs.

Whereas the drawing and accompanying description have shown and described a preferred embodiment of the present invention, it should be apparent to those skilled in the art that various changes may be made in the form of the invention without affecting the scope thereof.

What I claim is:

1. A dispensing device for animal food material which comprises a container that has a discharge opening formed and disposed to permit food material to fall downwardly from it, a valve element adjacent said opening which responds to vertically directed valve-closing forces to move toward said opening to keep food material from passing through said opening and responds to the absence of vertically directed valve-closing forces to move away from said opening to permit food material to pass through said opening, a food material supporting tray disposed below and in register with said opening to receive food material passing through said opening, biasing means urging said valve element away from said opening, and a connection between said valve element and said tray which enables the weight of said tray and of material on said tray to apply vertically directed valve-closing forces to said valve element and thereby bias said valve element toward said opening, said connection having an automatically extensible and retractable portion which is yieldable in the vertical direction and thereby enables said container to move upwardly relative to said tray without applying hurtful forces to said tray or to said valve element or to said connection, said extensible and retractable portion of said connection defining a means for automatically permitting said container to move downwardly relative to said tray without subjecting said tray or said container or said connection to hurtful forces, said connection and said tray normally acting to maintain a regulated weight of material on said tray, by permitting said biasing means to move said valve element away from said opening and thereafter responding to the weight of additionally dispensed material to move said valve element back toward said opening, said extensible and retractable portion of said connection automatically responding to appreciable upward movement of said container relative to said tray to yield and to develop an increased restorative force therein, said extensible and retractable portion of said connection automatically responding to subsequent downward movement of said container relative to said tray to retract and to decrease the restorative force therein, said extensible and retractable portion of said connection automatically keeping downward movement of said container relative to said tray from causing said valve element to move away from said opening unless said downward movement of said container relative to said tray reduces the restorative force within said extensible and retractable portion of said connection below its normal value.

2. An animal food dispensing device which comprises a container that has a discharge opening formed and disposed to permit the food material to fall downwardly from it, a valve element adjacent said opening which responds to vertically directed valve-closing forces to move toward said opening to keep material from passing through said opening and responds to the absence of vertically directed valve-closing forces to move away from said opening to permit material to pass through said opening, a material supporting tray disposed below and in register with said opening to receive material passing through said opening, biasing means urging said valve element away from said opening, a connection between said valve element and said tray which enables the weight of said tray and of material on said tray to apply vertically directed valve-closing forces to said valve element and thereby bias said valve element toward said opening, said connection having an automatically extensible and retractable portion which is yieldable in the vertical direction and thereby enables said container to move upwardly relative to said tray without applying hurtful forces to said tray or to said valve element or to said connection, said extensible and retractable portion of said connection defining a means for automatically permitting said container to move downwardly relative to said tray without subjecting said tray or said container or said connection to hurtful forces, said connection and said tray normally acting to maintain a regulated weight of material on said tray, by permitting said biasing means to move said valve element away from said opening and thereafter responding to the weight of additionally dispensed material to move said valve element back toward said opening, said extensible and retractable portion of said connection automatically responding to appreciable upward movement of said container relative to said tray to yield and to develop an increased restorative force therein, said extensible and retractable portion of said connection automatically responding to subsequent downward movement of said container relative to said tray to retract and to decrease the restorative force therein, said extensible and retractable portion of said connection automatically keeping downward movement of said container relative to said tray from causing said valve element to move away from said opening unless said downward movement of said container relative to said tray reduces the restorative force within said extensible and retractable portion of said connection below its normal value, said extensible and retractable portion of said connection automatically responding to subsequent downward movement of said container relative to said tray to retract and to decrease the restorative force therein, said extensible and retractable portion of said connection automatically keeping downward movement of said container relative to said tray from causing said valve element to move away from said opening unless said downward movement of said container relative to said tray reduces the restorative force within said extensible and retractable portion of said connection below its normal value, said extensible and retractable portion of said connection being adjacent the upper end of said connection, and the lower portion of said connection being a stiff member fixedly secured to said tray.

3. A dispensing device as claimed in claim 1 wherein a hook loosely secures the upper end of said extensible and retractable portion of said connection to said valve element, and wherein a stiff member secures the lower end of said extensible and retractable portion of said connection to said tray.

4. A dispensing device as claimed in claim 1 wherein said biasing means develops a rotational moment tending to move said valve element away from said opening, wherein said tray and said connection and the material on said tray develop a rotational moment tending to move said valve element toward said opening, and means to adjust the magnitudes of said rotational moments.

5. A dispensing device as claimed in claim 1 wherein a threaded rod projects outwardly from said valve element, wherein a nut on said threaded rod connects said biasing means to said valve element, and wherein a second nut on said threaded rod connects said connection to said valve element.

6. A dispensing device as claimed in claim 1 wherein said valve element is doorlike in configuration and has flanges that extend into said opening even when said valve element is open.

7. An animal food dispensing device which comprises a container that has a discharge opening formed and disposed to permit the food material to fall downwardly from it, a valve element adjacent said opening which responds to vertically directed valve-closing forces to move toward said opening to keep material from passing through said opening and responds to the absence of vertically directed valve-closing forces to move away from said opening to permit material to pass through said opening, a material supporting tray disposed below and in register with said opening to receive material passing through said opening, biasing means urging said valve element away from said opening, a connection between said valve element and said tray which enables the weight of said tray and of material on said tray to apply vertically directed valve-closing forces to said valve element and thereby bias said valve element toward said opening, said connection having an automatically extensible and retractable portion which is yieldable in the vertical direction and thereby enables said container to move upwardly relative to said tray without applying hurtful forces to said tray or to said valve element or to said connection, said extensible and retractable portion of said connection defining a means for automatically permitting said container to move downwardly relative to said tray without subjecting said tray or said container or said connection to hurtful forces, said connection and said tray normally acting to maintain a regulated weight of material on said tray, by permitting said biasing means to move said valve element away from said opening and thereafter responding to the weight of additionally dispensed material to move said valve element back toward said opening, said extensible and retractable portion of said connection automatically responding to appreciable upward movement of said container relative to said tray to yield and to develop an increased restorative force therein, said extensible and retractable portion of said connection automatically responding to subsequent downward movement of said container relative to said tray to retract and to decrease the restorative force therein, said extensible and retractable portion of said connection automatically keeping downward movement of said container relative to said tray from causing said valve element to move away from said opening unless said downward movement of said container relative to said tray reduces the restorative force within said extensible and retractable portion of said connection below its normal value, said container being mounted on a float, said float having an opening therein below and in register with said opening in said container, and a tube surrounding said opening in said float and extending upwardly toward said opening in said container to shield said opening in said container from spray.

8. An animal food dispensing device which comprises a container that has a discharge opening formed and disposed to permit the food material to fall downwardly from it, a valve element adjacent said opening which responds to vertically directed valve-closing forces to move toward said opening to keep material from passing through said opening and responds to the absence of vertically directed valve-closing forces to move away from said opening to permit material to pass through said opening, a material supporting tray disposed below and in register with said opening to receive material passing through said opening, biasing means urging said valve element away from said opening, a connection between said valve element and said tray which enables the weight of said tray and of material on said tray to apply vertically directed valve-closing forces to said valve element and thereby bias said valve element toward said opening, said connection having an automatically extensible and retractable portion which is yieldable in the vertical direction and thereby enables said container to move upwardly relative to said tray without applying hurtful forces to said tray or to said valve element or to said connection, said extensible and retractable portion of said connection defining a means for automatically permitting said container to move downwardly relative to said tray without subjecting said tray or said container or said connection to hurtful forces, said connection and said tray normally acting to maintain a regulated weight of material on said tray, by permitting said biasing means to move said valve element away from said opening and thereafter responding to the weight of additionally dispensed material to move said valve element back toward said opening, said extensible and retractable portion of said connection automatically responding to appreciable upward movement of said container relative to said tray to yield and to develop an increased restorative force therein, said extensible and retractable portion of said connection automatically responding to subsequent downward movement of said container relative to said tray to retract and to decrease the restorative force therein, said extensible and retractable portion of said connection automatically keeping downward movement of said container relative to said tray from causing said valve element to move away from said opening unless said downward movement of said container relative to said tray reduces the restorative force within said extensible and retractable portion of said connection below its normal value, said container being mounted on a float, said float having an opening therein to receive material passing through said opening in said container, and a tube surrounding said opening in said float and extending downwardly into the water, said tube keeping buoyant material from floating away from said opening in said float.

9. A dispensing device as claimed in claim 1 wherein said tray is stiff, and wherein said connection has a stiff portion fixedly secured at right angles to said tray.

10. An animal food dispensing device which comprises a container that has a discharge opening formed and disposed to permit the food material to fall downwardly from it, a valve element adjacent said opening which responds to vertically directed valve-closing forces to move toward said opening to keep material from passing through said opening and responds to the absence of vertically directed valve-closing forces to move away from said opening to permit material to pass through said opening, a material supporting tray disposed below and in register with said opening to receive material passing through said opening, biasing means urging said valve element away from said opening, a connection between said valve element and said tray which enables the weight of said tray and of material on said tray to apply vertically directed valve-closing forces to said valve element and thereby bias said valve element toward said opening, said connection having an automatically extensible and retractable portion which is yieldable in the vertical direction and thereby enables said container to move upwardly relative to said tray without applying hurtful forces to said tray or to said valve element or to said connection, said extensible and retractable portion of said connection defining a means for automatically permitting said container to move downwardly relative to said tray without subjecting said tray or said container or said connection to hurtful forces, said connection and said tray normally acting to maintain a regulated weight of material on said tray, by permitting said biasing means to move said valve element away from said opening and thereafter responding to the weight of additionally dispensed material to move said valve element back toward said opening, said extensible and retractable portion of said connection automatically responding to appreciable upward movement of said container relative to said tray to yield and to develop an increased restorative force therein, said extensible and retractable portion of said connection automatically responding to subsequent downward movement of said container relative to said tray to retract and to decrease the restorative force therein, said extensible and retractable portion of said connection automatically keeping downward movement of said container relative to said tray from causing said valve element to move away from said opening unless said downward movement of said container relative to said tray reduces the restorative force within said extensible and retractable portion of said connection below its normal value, said container being mounted on a float, and said float having an opening therein below and in register with said opening in said container.

* * * * *